United States Patent
Kim et al.

(10) Patent No.: US 8,311,397 B2
(45) Date of Patent: *Nov. 13, 2012

(54) METHOD FOR SUPPORTING A STILL PICTURE OF DATA STREAM RECORDED IN A DISK RECORDING MEDIUM

(75) Inventors: Byung-Jin Kim, Kyunggi-do (KR); Kang-Soo Seo, Kyunggi-do (KR); Jea-Yong Yoo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/040,504

(22) Filed: Mar. 4, 2011

(65) Prior Publication Data

US 2011/0150416 A1 Jun. 23, 2011

Related U.S. Application Data

(63) Continuation of application No. 12/457,137, filed on Jun. 2, 2009, which is a continuation of application No. 10/810,720, filed on Mar. 29, 2004, now Pat. No. 7,593,624, which is a continuation of application No. 09/698,623, filed on Oct. 30, 2000, now Pat. No. 7,058,290.

(30) Foreign Application Priority Data

Oct. 30, 1999 (KR) .................. 1999-47843

(51) Int. Cl.
H04N 5/84 (2006.01)
H04N 9/80 (2006.01)

(52) U.S. Cl. .................. 386/333; 386/248
(58) Field of Classification Search .......... 386/333, 386/326, 329, 332, 225, 248
See application file for complete search history.

(56) References Cited

U.S. PATENT DOCUMENTS

| | | |
|---|---|---|
| 5,999,693 A | 12/1999 | Juri et al. |
| 6,266,478 B1 | 7/2001 | Yoshio et al. |
| 6,424,797 B1 | 7/2002 | Murase et al. |
| 6,470,140 B1 | 10/2002 | Sugimoto et al. |
| 6,697,565 B2 | 2/2004 | Ando et al. |
| 6,757,485 B1 | 6/2004 | Funakoshi |
| 7,167,635 B1 * | 1/2007 | Ando et al. .......... 386/248 |
| 7,236,836 B1 | 6/2007 | Tanaka et al. |
| 7,426,334 B2 | 9/2008 | Ando et al. |
| 7,593,624 B2 | 9/2009 | Kim et al. |
| 2002/0057899 A1 | 5/2002 | Nakano et al. |

(Continued)

FOREIGN PATENT DOCUMENTS

KR 10-19990058175 7/1999

OTHER PUBLICATIONS

U.S. Office Action dated Sep. 23, 2011 for U.S. Appl. No. 11/600,226, 8 pages.

(Continued)

*Primary Examiner* — Robert Chevalier
(74) *Attorney, Agent, or Firm* — Fish & Richardson P.C.

(57) ABSTRACT

In the method, video data is reproduced from the recording medium, and an I-picture and a number of P-pictures are output as a still picture based on the reproduced video data. The output data may then be received and decoded for display.

17 Claims, 4 Drawing Sheets

U.S. PATENT DOCUMENTS

| | | |
|---|---|---|
| 2002/0090207 A1 | 7/2002 | Mishima et al. |
| 2002/0176695 A1 | 11/2002 | Sawabe et al. |
| 2006/0239647 A1 | 10/2006 | Mori et al. |
| 2009/0245753 A1 | 10/2009 | Kim et al. |
| 2011/0150416 A1 | 6/2011 | Kim et al. |

OTHER PUBLICATIONS

US Office Action dated Jan. 10, 2012 for U.S. Appl. No. 11/600,226, 8 pages.
US Office Action dated Feb. 13, 2012 for U.S. Appl. No. 12/457,137, 11 pages.

* cited by examiner

METHOD FOR SUPPORTING A STILL PICTURE OF DATA STREAM RECORDED IN A DISK RECORDING MEDIUM

CROSS-REFERENCE TO RELATED APPLICATIONS

This application is a continuation of U.S. application Ser. No. 12/457,137, filed Jun. 2, 2009, now pending, which is a continuation of U.S. application Ser. No. 10/810,720, filed Mar. 29, 2004, now U.S. Pat. No. 7,593,624, which is a continuation of U.S. application Ser. No. 09/698,623, filed Oct. 27, 2000, now U.S. Pat. No. 6,610,065, which claims the benefit of a foreign priority application filed in Korea as Serial No. 1999-47843 on Oct. 30, 1999, all of which are incorporated by reference.

BACKGROUND OF THE INVENTION

1. Field of the Invention

The present invention relates to method of reproducing data; and more particularly, a still picture.

2. Description of the Related Art

A high-density digital versatile disk (HD-DVD), whose recording standard is under discussion among related companies, is a high-capacity storage device for moving pictures of large size, so that it will be widely used soon. In the meantime, a disk reproducing device (referred as 'HDVD player' hereinafter) which is being developed to reproduce a high-density digital versatile disk is expected to be connected with a digital television through IEEE 1394 standard when it playbacks an inserted disk.

When a HDVD player is connected with a digital television to playback a HD-DVD, it should have specific video pictures to be displayed as still images on a screen of a digital television. Examples of the specific video pictures are a background image of menu bars for selection of various functions provided from a HD-DVD, and a menu screen for editing a content scenario of a moving picture program recorded in a HD-DVD.

To embody still picture of data stream recorded in a DVD-ROM which is being popularized more and more, a still mark is written behind a data stream section corresponding to a still picture, and a DVD-ROM player, which can reproduce a DVD-ROM disk, repeats to output the last-decoded stream section if a still mark is detected while reproducing recorded programs.

This method is possible since a DVD-ROM player has been developed in expectation that it is to be connected with an analog television not equipped with a MPEG decoder so that it has a MPEG decoder as an internal component, therefore, a DVD-ROM player can detect still marks contained in data stream while decoding data stream recorded in a DVD-ROM disk.

However, a HDVD-player may not have a MPEG decoder as an internal component since it is under development on assumption that it may be connected a digital television equipped with a MPEG decoder through a digital interface such as IEEE 1394 as aforementioned.

Therefore, even though still marks are inserted in every data stream section corresponding to still picture in a HD-DVD as in a DVD-ROM, a HDVD player can not conduct still operation lilt has not a decoder, that is, it can not detect the still mark.

In addition, a digital television developed at present can not support still function for data stream when it receives data stream from a HDVD player connected through a digital interface, so that it is urgently required to develop a method of presenting a specific data stream section from a disk device such as a HDVD player in a still picture at a digital television.

SUMMARY OF THE INVENTION

In the method of reproducing a still picture from a recording medium according to one embodiment of the present invention, an I-picture and a number of P-pictures are output as a still picture based on video data reproduced from the recording medium. For example, the P-pictures output represent a same picture as the I-picture being output.

In another embodiment of the present invention, the I-picture and the number of P-pictures representing a still picture are received and decoded for display.

BRIEF DESCRIPTION OF THE DRAWINGS

The accompanying drawings, which are included to provide a further understanding of the invention, illustrate the example embodiments of the invention, and together with the description, serve to explain the principles of the present invention.

In the drawings.

DETAILED DESCRIPTION OF THE EXEMPLARY EMBODIMENTS

In order that the invention may be fully understood, exemplary embodiments thereof will now be described with reference to the accompanying drawings.

Figure 1:
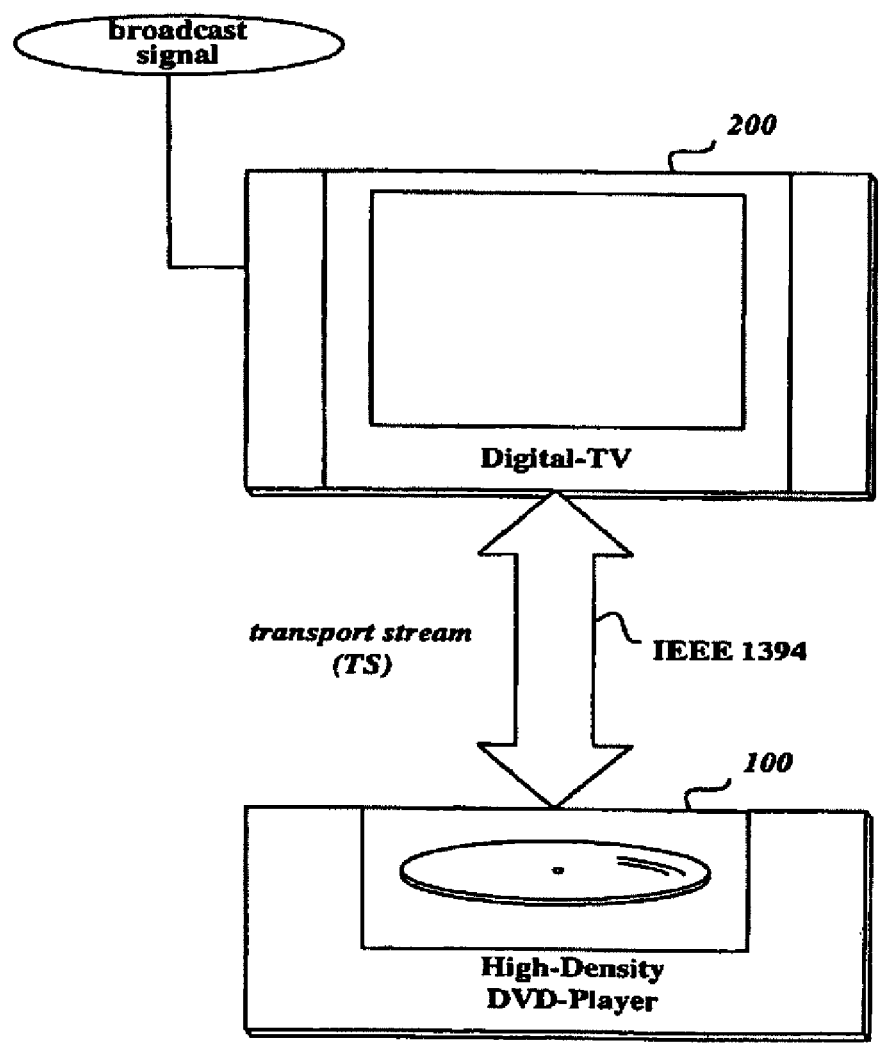
FIG. 1 shows a digital television and a HDVD player to which a method for supporting a still picture of data stream recorded in a disk according to the present invention is applied.

FIG. 1 shows a digital television 200 and a HDVD player 100 to which a method for supporting a still picture of data stream recorded in a disk according to the present invention is applied. The digital television 200 and the HDVD player 100 are connected each other through a IEEE 1394 digital interface.

The data written in a HD-DVD which is to be playbacked in the HDVD player 100 is grouped into high-density stream objects (called 'HOBs' hereinafter). A HOB may correspond to a single program or a digital stream recorded from recording start to stop, and it is to be associated with each cell which is used for determining the playback sequence of moving picture contents recorded in a HD-DVD.

Figure 2:
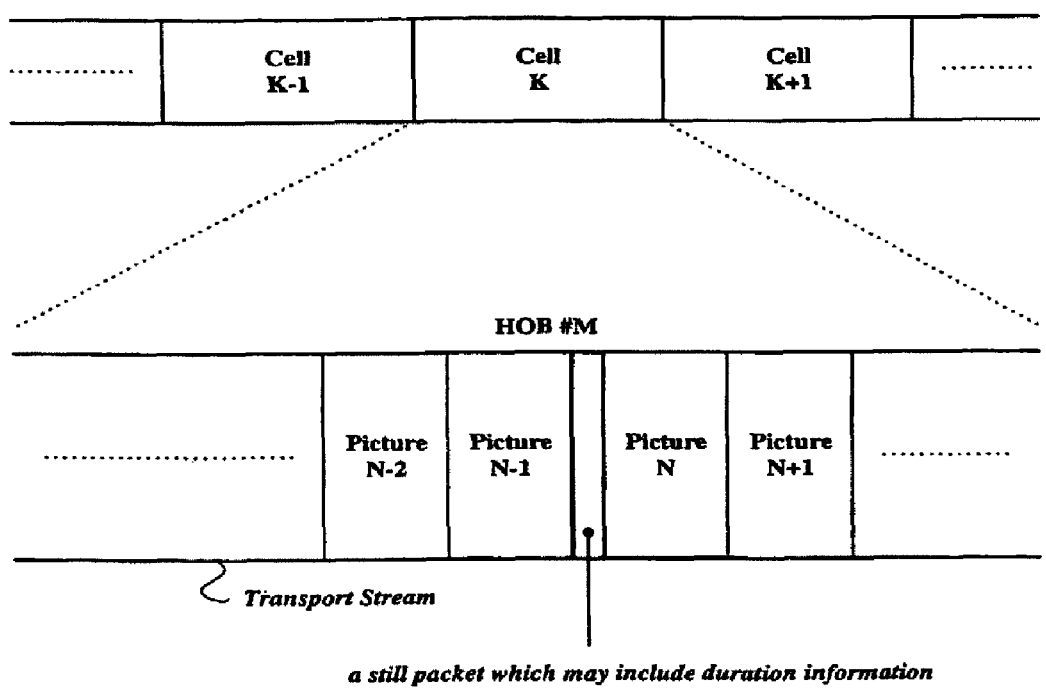
FIG. 2 shows a format example of a recorded stream to embody a still picture supporting method according to the present invention.

FIG. 2 shows a format example of a recorded stream to embody a still picture supporting method according to the present invention.

As shown in FIG. 2, the data stream belonging to a certain HOB contains a still packet as still information. The function of a still packet is to command the digital television 200 to repeat to decode a stream constituting a single picture following the still packet instead of advancing the reproduction, and a still packet contains still duration information indicating how long the requested still operation lasts. The still duration is classified into two types of the definite and the indefinite. The definite type may have time value ranging from 1 to 254 seconds, and the indefinite type is used in a condition that a key command from a user is necessary.

When the data stream recorded as in FIG. 2 is reproduced in the HDVD player 100 and is transmitted to the digital television 200 through the isochronous channel of the IEEE 1394 digital bus, the still packet is also transmitted to the digital television 200 without being decoded. When the digital television 200 receives the still packet while decoding the received data stream into real video and/or audio signal, it extracts still duration information from the received still packet. After that, the digital television 100 decodes data stream section, which is following the still packet, corresponding to a single picture and then repeats outputting the just-decoded video picture during the time indicated by the extracted still duration information.

If the time indicated by the still duration information expires, the digital television 200 stops repeating of decoding of same picture, and then resumes to decode next pictures, which may have been already stored in an internal buffering memory, succeeding the still picture.

Through the above-explained operations, a picture can be held as a still picture in a digital television for a certain time.

In the above-explained embodiment of the still picture supporting method, an additional command for holding a picture and resuming successive decoding needs not be sent from the HDVD player 100 to the digital television 200.

Instead of positioning a still packet before a still picture, a still packet may be preceded by a still picture. In this case, the HDVD player 100 may turn its mode into a pause without advancing next pictures as soon as it identifies a packet as a still one based on a packet header. And the digital television 200 repeats decoding a partial data stream, which is received prior to a still packet, constituting a single picture when the received packet is determined as a still one. This interoperation between the HDVD player 100 and the digital television 200 can also achieve still function.

The still packet may not contain information on still duration. Instead, the HDVD player 100 resumes data reproduction from recorded data following the still packet and transmits the reproduced data stream to the digital television 100 if a user requests release of still status. According to the resumption of data reproduction, the digital television 200 receives data packets next to the still packet, then it acknowledges the reception of data packet as release of still picture, and decodes the received data packets as soon as it stops repetition of decoding of one picture.

Figure 3A:
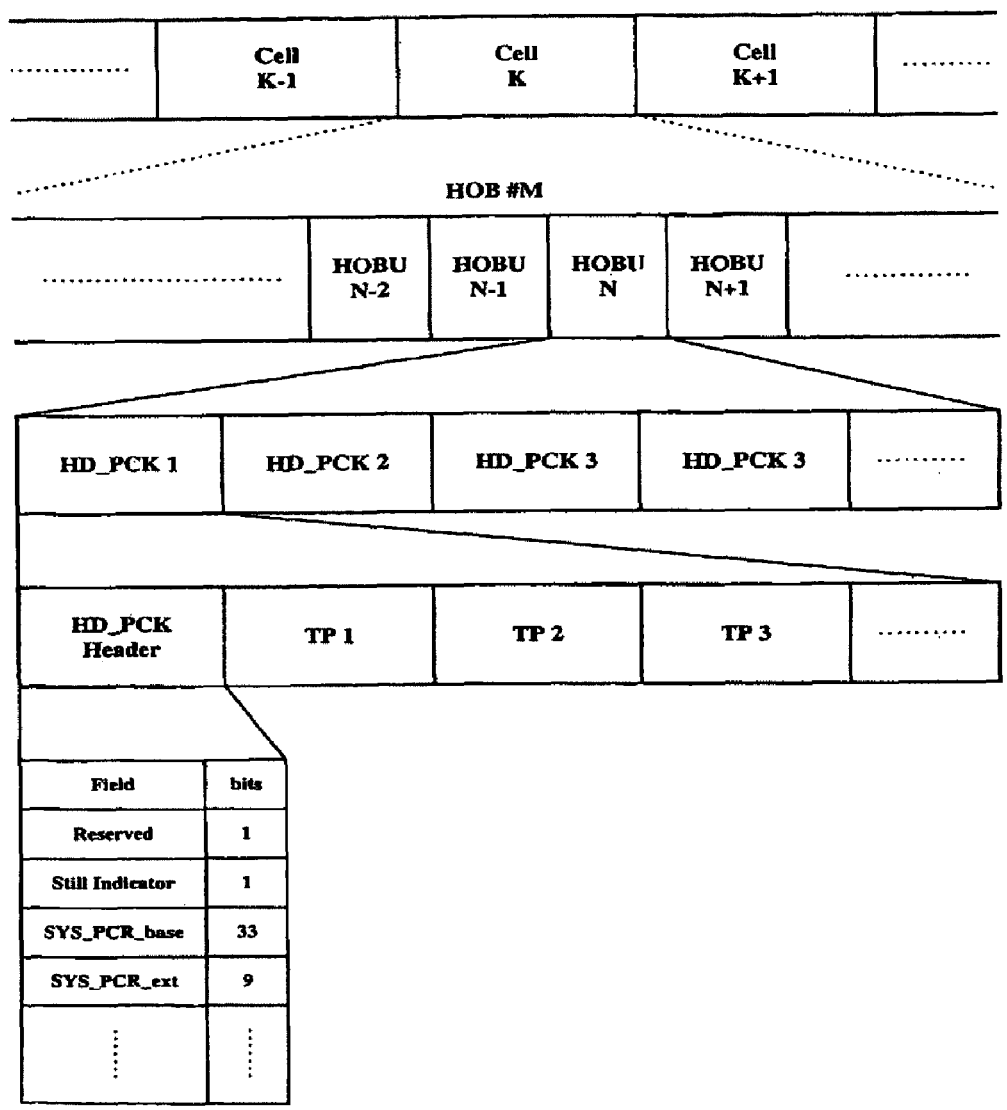
FIG. 3A shows a format example of a recorded stream to embody another still picture supporting method according to the present invention.

FIG. 3A shows another format example of a recorded stream to embody a still picture supporting method according to the present invention.

As explained above referring to FIG. 2, the data written in a HD-DVD which is to be playbacked in the HDVD player 100 is grouped into HOBs. A HOB is also corresponding to a single program or a digital stream recorded from recording start to stop, and it is related with each cell which is used for determining the playback sequence of moving picture contents recorded in a HD-DVD.

And, a HOB is composed of high-density stream object units (referred 'HOBUs' hereinafter), and a data stream constituting a HOBU is recorded across a lot of data packs as shown in FIG. 3A. A data pack is a data accessing unit whose size is physically readable and/or writable at a time, that is, it is corresponding to a sector of a DVD-ROM. Each data pack consists of a pack header and several transport packets written in it.

The pack header comprises fields of 'STILL Indicator', 'SYS_PCR_base', 'SYS_PCR_ext, and 'Reserved'. A transport packet may contain a program clock reference (PCR) which consists of a 9-bit extension value and a 33-bit base value according to the MPEG standard. The extension value is a modulo-300 counter that is incremented at a rate of 27 MHz, whereas the base value is incremented at a rate of 90 KHz. If a transport packet contains a PCR, the PCR is copied to the fields of 33-bit 'SYS_PCR_base' and 9-bit 'SYS_PCR_ ext', respectively. The field of 'STILL Indicator' is a 1-bit flag and is used to indicate whether or not a data pack has data stream to be transmitted repeatedly. That is, if the flag is 1, it means that the pack and following packs including data of Infra-coded picture (I-picture) and predictive pictures (P-pictures) should be transmitted repeatedly.

Figure 3B:
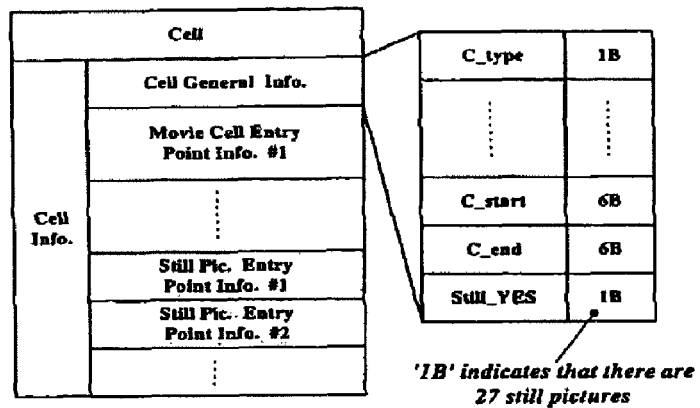
FIG. 3B shows an information example written in a cell associated with a stream object containing a still picture data.

In addition, a cell associated with a HOB containing one or more still pictures consists of general information and still picture entry point information as shown in FIG. 3B. The general information has various information on reproduction sequence of still pictures, whether there is still picture or not, and the number of still pictures. And, the still picture entry point information has information indicating all of HOBUs in which data stream sections corresponding to still pictures are written. The information on whether there is still picture or not and the number of still pictures is written in 1-byte field of 'Still_YES'.

Therefore, when reproducing a HD-DVD, the HDVD player 100 examines information written in a cell to know whether there is still picture and where still picture is written among a lot of HOBUs, and searches for a corresponding HOBU based on the known information. Then, it examines the successive pack headers belonging to the HOBU to know whether the value of 'STILL Indicator' field is 1 or not.

Figure 4:
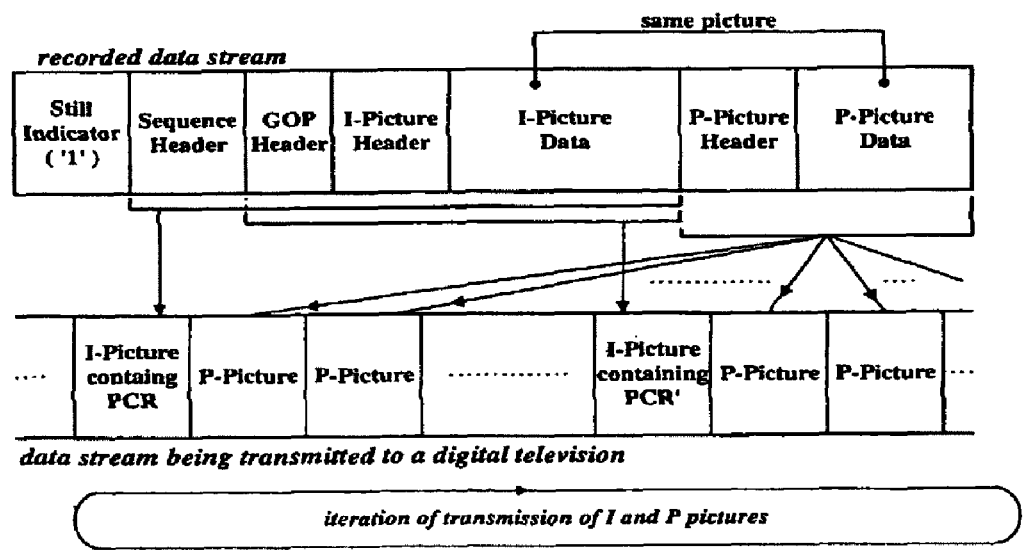
FIG. 4 shows a transmission example of a recorded stream corresponding to a still picture according to another embodiment of the present invention.

If the value is 1, the HDVD player 100 reads data stream section containing I-picture data and next P-picture data only and then repeats to transmit the read data stream section to the digital television 200 as shown in FIG. 4. The I-picture data is composed of a sequence header, a header of group of pictures (GOP), and real video data, and the P-picture data is composed of a header and predictive real data.

The transmission ratio of I-picture to P-picture is 1:15. That is, a I-picture is transmitted once every 15 transmission of P-picture. When transmitting the I-picture repeatedly, the HDVD player 100 generates a PCR whose value is transporting time of each transport packet constituting the I-picture, and inserts it into every packets or every a few packets. When transmitting P-pictures repeatedly, the HDVD player 100 transmits P-picture header only without transmitting predictive real data.

The information of transmitting repetition duration, i.e., still duration may be written in a cell or a pack header. If this information has been written, the HDVD player 100 resumes next reproduction after stopping the transmitting repetition when the still duration expires, if has not, it resumes next reproduction when a user requests to do that.

In this embodiment of still picture supporting method, the digital television 200 needs not conduct an additional operation for still mode, instead, it just conducts a normal operation to decode the received data stream section provided repeatedly from the HDVD player 100.

The still picture supporting method according to the present invention makes it possible to present a background image of menu bars for selection of various functions provided from a HD-DVD and a menu screen for editing a content scenario of a moving picture program recorded in a HD-DVD as a still picture on a digital television on condition that a HDVD player is delivering real data in the format of data stream to a digital television connected through a digital interface such as IEEE 1394.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An apparatus comprising:
   a receiving unit configured to receive a data stream, the data stream including at least one of a video data packet and a still data packet, and the still data packet including at least still picture data;
   a decoder configured to decode data;
   a display unit configured to display information; and
   a controller configured to:
   determine whether or not the data stream includes the still data packet based on a still indicator, the still indicator being included in the data stream and having a first indicator value to indicate that the still data packet exists in the data stream and a second indicator value to indicate that the still data packet does not exist in the data stream, and in response to a determination that the still indicator has the first indicator value:
   control the receiving unit to obtain the data stream including the still data packet,
   control the decoder to decode the obtained still data packet, and
   control the display unit to display a menu, and
   in response to a determination that the still indicator has the second indicator value:
   control the receiving unit to obtain the data stream.

2. The apparatus of claim 1, wherein the controller is configured to control the display unit to display the menu by using the decoded still data packet.

3. The apparatus of claim 1, wherein the controller is further configured to control the display unit to display a screen for editing video data.

4. The apparatus of claim 1, wherein the receiving unit includes a digital interfacing unit configured to connect the apparatus to an external device.

5. The apparatus of claim 1, wherein the data stream includes a video data stream and management information for managing reproduction of the video data stream.

6. The apparatus of claim 5, wherein the management information for managing reproduction of the video data stream includes the still indicator, and wherein the controller controls the receiving unit to obtain the data stream including the still data packet using identification information included in the management information.

7. The apparatus of claim 1, wherein the data stream includes both the video data packet and the still data packet.

8. The apparatus of claim 1, wherein the still indicator is a 1-bit flag.

9. The apparatus of claim 1, wherein the controller is further configured to select a function based on input provided to the displayed menu.

10. A method comprising:
    receiving a data stream, the data stream including at least one of a video data packet and a still data packet, and the still data packet including at least still picture data;
    determining whether or not the data stream includes the still data packet based on a still indicator, the still indicator being included in the data stream and having a first indicator value to indicate that the still data packet exists in the data stream and a second indicator value to indicate that the still data packet does not exist in the data stream; and
    in response to a determination that the still indicator has the first indicator value:
    obtaining the data stream including the still data packet;
    decoding the obtained still data packet; and
    displaying a menu; and
    in response to a determination that the still indicator has the second indicator value:
    obtaining the data stream.

11. The method of claim 10, wherein the menu is displayed by using the decoded still data packet.

12. The method of claim 10, further comprising displaying a screen for editing video data.

13. The method of claim 10, wherein the data stream includes a video data stream and management information for managing reproduction of the video data stream.

14. The method of claim 13, wherein the management information for managing reproduction of the video data stream includes the still indicator, and wherein the data stream including the still data packet is obtained using identification information included in the management information.

15. The method of claim 10, wherein the data stream includes both the video data packet and the still data packet.

16. The method of claim 10, wherein the still indicator is a 1-bit flag.

17. The method of claim 10, further comprising selecting a function based on input provided to the displayed menu.

* * * * *